US008964543B1

(12) United States Patent
Roskind et al.

(10) Patent No.: US 8,964,543 B1
(45) Date of Patent: Feb. 24, 2015

(54) SYSTEM AND METHOD OF REDUCING LATENCY BY TRANSMITTING DUPLICATE PACKETS OVER A NETWORK

(75) Inventors: James Roskind, Redwood City, CA (US); Michael A. Belshe, Saratoga, CA (US)

(73) Assignee: Google Inc., Mountain View, CA (US)

( * ) Notice: Subject to any disclaimer, the term of this patent is extended or adjusted under 35 U.S.C. 154(b) by 934 days.

(21) Appl. No.: 12/706,348

(22) Filed: Feb. 16, 2010

(51) Int. Cl.
*H04L 12/70* (2013.01)

(52) U.S. Cl.
USPC ........... 370/231; 370/235; 370/252; 709/203; 709/237

(58) Field of Classification Search
None
See application file for complete search history.

(56) References Cited

U.S. PATENT DOCUMENTS

| | | |
|---|---|---|
| 5,961,605 A | 10/1999 | Deng et al. |
| 6,205,120 B1 | 3/2001 | Packer et al. |
| 6,215,769 B1 | 4/2001 | Ghani et al. |
| 6,219,713 B1 | 4/2001 | Ruutu et al. |
| 6,252,851 B1 | 6/2001 | Siu et al. |
| 6,341,129 B1 | 1/2002 | Schroeder et al. |
| 6,446,121 B1 | 9/2002 | Shah et al. |
| 6,646,987 B1 | 11/2003 | Qaddoura |
| 6,788,704 B1 | 9/2004 | Lindsay |
| 6,925,060 B2 | 8/2005 | Mangin |
| 6,958,997 B1 | 10/2005 | Bolton |
| 7,142,536 B1 | 11/2006 | Gossett et al. |
| 7,174,386 B2 | 2/2007 | Cunningham et al. |
| 7,225,266 B2 | 5/2007 | Ameigeiras et al. |
| 2002/0080721 A1* | 6/2002 | Tobagi et al. ................. 370/236 |
| 2002/0112057 A1 | 8/2002 | Srinivas et al. |
| 2004/0008693 A1* | 1/2004 | Grove et al. ............. 370/395.52 |
| 2004/0128346 A1 | 7/2004 | Melamed et al. |
| 2005/0259577 A1* | 11/2005 | Sin ................. 370/229 |
| 2007/0121639 A1* | 5/2007 | Degrande et al. ............. 370/394 |
| 2008/0075000 A1 | 3/2008 | Robbins |
| 2008/0089230 A1 | 4/2008 | Kootstra |
| 2009/0268747 A1* | 10/2009 | Kurata et al. ................. 370/412 |
| 2010/0008223 A1* | 1/2010 | Messing et al. ............... 370/231 |
| 2010/0085966 A1* | 4/2010 | Samuels et al. ............... 370/389 |
| 2010/0322150 A1* | 12/2010 | Wilcoxson et al. ........... 370/321 |
| 2011/0110260 A1* | 5/2011 | Yoneda et al. ................. 370/252 |

OTHER PUBLICATIONS

Paxson et al., RFC 2581—TCP Congestion Control, http://www.opalsoft.net/qos/TCP-1010.htm (2009).
Huston, TCP—How it works, The ISP Column (2004).

* cited by examiner

*Primary Examiner* — Duc Duong
(74) *Attorney, Agent, or Firm* — Lerner, David, Littenberg, Krumholz & Mentlik, LLP (57) ABSTRACT

A system and method transmits data so as to reduce latency in the transmissions. In one aspect, a sending device may determine a minimum number N of packets necessary to transmit information to a receiving device. In accordance with this aspect, in addition to transmitting all or some of the N number of packets in a given series, the sending device may additionally transmit one or more duplicate packets, where each duplicate packet contains data duplicative of the data contained in the last or $N^{th}$ packet transmitted in the series.

24 Claims, 10 Drawing Sheets

SYSTEM AND METHOD OF REDUCING LATENCY BY TRANSMITTING DUPLICATE PACKETS OVER A NETWORK

BACKGROUND OF THE INVENTION

The Internet protocol suite is a well known and widely used suite of protocols for servicing data transmissions between two devices communicating information over the Internet. In particular, the Transmission Control Protocol or TCP is a part of the Internet protocol suite that provides for connection-oriented, reliable, and ordered delivery of a stream of information (i.e., payload data) between, for example, a web-browser application running on a client device and a web-server application running on a server device over a local or wide area network.

To communicate with a server device using the TCP protocol, a client device must first establish a TCP connection with the server. After a TCP connection is established, each device may transmit information to the other device in a sequence of discrete data packets, where each data packet contains a header portion and a data portion.

To ensure efficient communication, the TCP protocol incorporates several mechanisms that determine the amount of data (e.g., bytes) that may be transmitted in a single data packet, the flow or rate at which multiple packets are exchanged between the devices, and the effect of the packet transmissions on overall network congestion.

For example, the maximum amount of payload data that a sending device may transmit in the data portion of a single data packet to a receiving device is governed by the maximum segment size ("MSS") value. By convention, the default MSS value is typically understood to be 1430-1460 bytes, but a larger or smaller MSS value may be set by the receiving device (based on its capabilities to receive a larger or smaller amount of data from the sending device in a single packet) and communicated to the sending device during the initial process of establishing the TCP connection. Once the MSS value is established, a sending device may not transmit a data packet where the data portion of the packet contains an amount of payload data exceeding the MSS value of the receiving device.

Another mechanism provided by the TCP/IP protocol to ensure reliable communication between two devices communicating over the network in accordance with the protocol is the acknowledgement mechanism, where each device acknowledges the reception of data received from the other device. For efficiency and in order to reduce network congestion, the receiving device typically does not send a separate acknowledgement for each data packet that it receives from the sending device. Rather, the acknowledgement mechanism of the TCP protocol is conventionally implemented such that the receiving device will delay transmitting an acknowledgment until it receives at least two data packets from the sending device. The delayed acknowledgement, when transmitted, typically acknowledges the reception of the data contained in two consecutive packets.

A sending device can often fit all of its data into a single packet, in which case it has only one packet to send. Accordingly, if the receiving device receives the first packet but does not receive a second packet, the receiving device will send an acknowledgement indicating the reception of the first packet after waiting for a prescribed amount of time (typically around 200 ms) for the second packet to arrive.

If the data acknowledged by the receiving device does not match the data that was transmitted (for example, if the receiving device only acknowledges the data in one packet when two data packets were transmitted by the server), the sending device retransmits the unacknowledged data packet to the receiving device, until all transmitted data is successfully acknowledged by the receiving device. Furthermore, if the sending device does not receive an acknowledgement within a prescribed period of time (because, for example, the client's acknowledgement packet is lost in transmission, or because none of the data packets transmitted by the server were received at the client device), the sending device retransmits unacknowledged data packets to the receiving device after waiting for an acknowledgement for a prescribed amount of time. The amount of time that the sending device waits prior to retransmitting the unacknowledged data packet is dynamically determined by the sending device based on estimated network conditions.

The mechanism known as the congestion window ("CW") is another aspect of the TCP protocol that is designed to increase efficiency. Rather than defining the maximum size of the packet, the CW defines the maximum amount of data that a sending device (e.g., a server) may transmit at any given time to a receiving device (e.g., a client) before having to wait for an authorization from the receiving device to send more. In this regard, the CW comprises the maximum number of packets that a sending device may transmit to a receiving device without having to wait for an acknowledgement from the receiving device, where the maximum amount of data contained in each of the transmitted packets is based upon the MSS value of the receiving device.

In particular, some conventional implementations of the TCP/IP protocol set the CW to an initial default value of two (2) packets. Thus, a sending device may initially send two data packets to a receiving device and then must wait for an acknowledgement prior to sending any more packets. Upon receiving an acknowledgement for the initial two packets, the sending device may increase the value CW and transmit a larger number of packets in a subsequent transmission.

The value of CW is typically increased by the number of packets that are acknowledged. Thus, for example, once the server receives an acknowledgement indicating the reception of the initial two packets, the server may increase the initial CW value (2 packets) by the number of acknowledged packets (2 packets), resulting in a new CW value of four (4) packets. Consequently, the server may now transmit four packets in a sequence to the client prior to having to wait for another acknowledgment.

The process of increasing the value of CW by the number of the acknowledged packets can theoretically continue indefinitely, until all available payload data has been successfully transmitted from the sending device to the receiving device. In the event that the sending device determines that one or more transmitted packets have been lost (i.e., because the transmitted packets have not been acknowledged by the receiving device within a prescribed period of time or because a negative acknowledgement is received), the value of CW is conventionally reduced by half (attributing the loss to congestion on the network) and the unacknowledged packets are retransmitted by the sending device in accordance with the reduced value of CW.

BRIEF SUMMARY OF THE INVENTION

In one aspect, a method of transmitting packets over a network is provided. The method includes receiving first data to be transmitted via the network to a client device; determining a first value with a processor, where the first value is based on the amount of the first data and a maximum data size of a data packet; transmitting, via the network, a plurality of data packets to the client device prior to receiving an indication from the client device that additional data packets may be sent, said transmitted plurality of data packets comprising a first series of one or more data packets and one or more duplicate data packets, each data packet in said first series containing a different portion of the first data and determined based on the first value, and each of said one or more duplicate data packets duplicative of a data packet transmitted in the first series.

In another aspect, a system is provided that includes memory storing instructions and data, and a processor to execute the instructions and to process the data. The data includes first data to be transmitted over a network to a client device, and the instructions include: determining a first value based on the amount of the first data and a maximum data size of a data packet; transmitting, via the network, a contiguous plurality of data packets to the client device, said transmitted plurality of data packets comprising a first series of one or more data packets and one or more duplicate data packets, each data packet in said first series containing a different portion of the first data and determined based on the first value, and each of said one or more duplicate data packets duplicative of a data packet transmitted in the first series.

In a yet another aspect a system is provided that includes: a first device at a first node of a network having access to first data to be transmitted over the network to a second device at a second node of the network. The first device includes a first memory storing a first set of instructions and a first processor that processes data in accordance with the first set of instructions, where the first set of instructions include: determining a first value based on the amount of the first data and a maximum data size of a data packet; transmitting, via the network, a plurality of data packets to the second device prior to receiving an indication from the second device that additional data packets may be sent, said transmitted plurality of data packets comprising a first series of one or more data packets and one or more duplicate data packets, each data packet in said first series containing a different portion of the first data and determined based on the first value, and each of said one or more duplicate data packets duplicative of a data packet transmitted in the first series. The second device includes a second memory storing a second set of instructions and a second processor that processes data in accordance with the second set of instructions, where the second set of instructions include: receiving one or more of the transmitted plurality of data packets from the first device via the network; transmitting an indication via the network to the first device that additional data may be sent; discarding one or more received data packets from the first device determined to be duplicative of another data packet received from the first device; and displaying first data contained in the one or more of received data packets to a user on a display.

BRIEF DESCRIPTION OF THE DRAWINGS

Other objects and advantages of the present invention will be apparent from the following detailed description of the present preferred embodiments, which description should be considered in conjunction with the accompanying drawings in which like reference indicate similar elements and in which.

DETAILED DESCRIPTION

In one aspect, a system and method is provided whereby latency between a sending device and receiving device, such as but not limited to a server and a client exchanging information over a network, is reduced by preemptively transmitting one or more duplicate data packets from the sending device to the receiving device.

Figure 1:
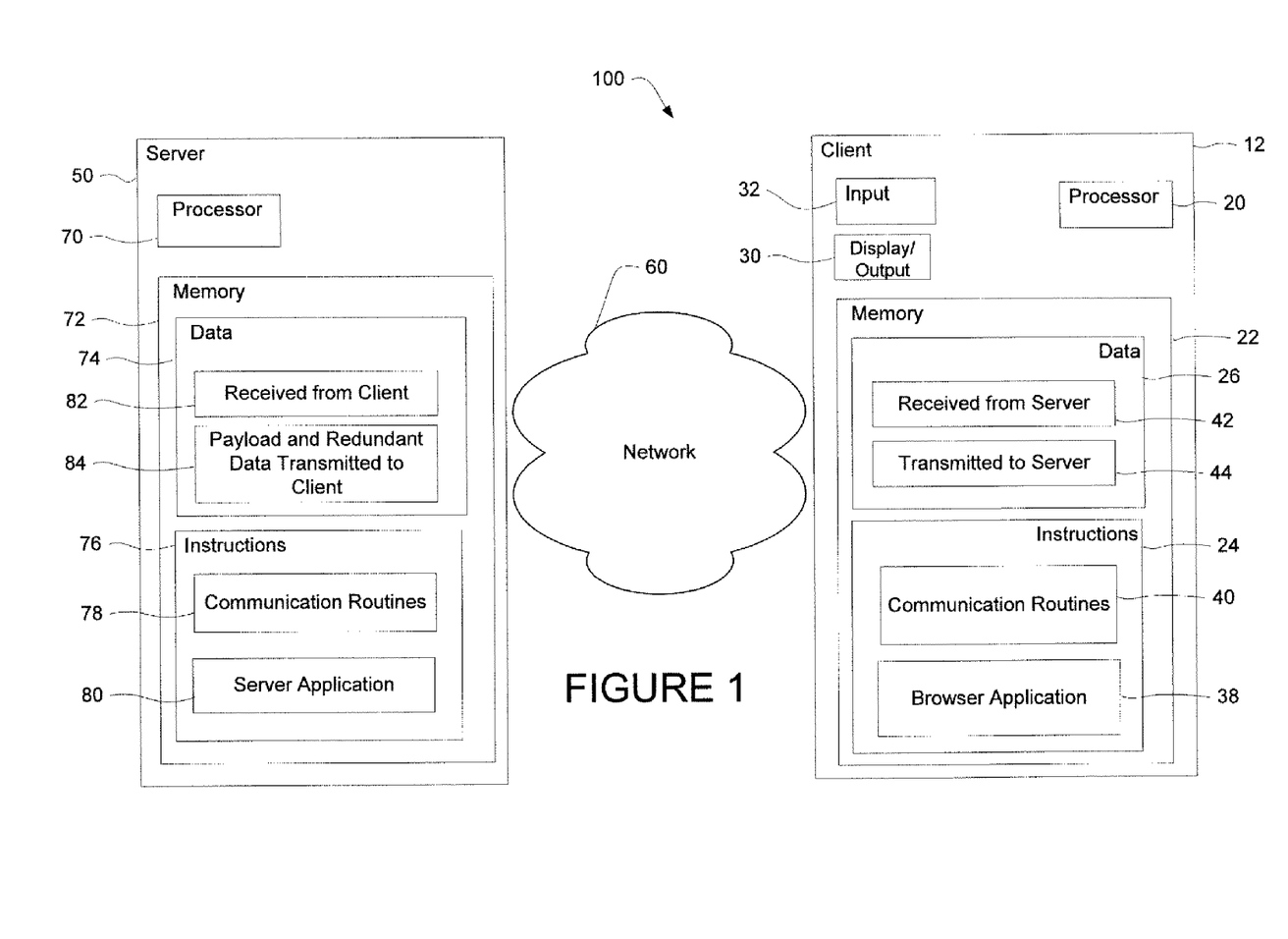
FIG. 1 is a block diagram of an exemplary embodiment of the system of FIG. 2.
Figure 2:
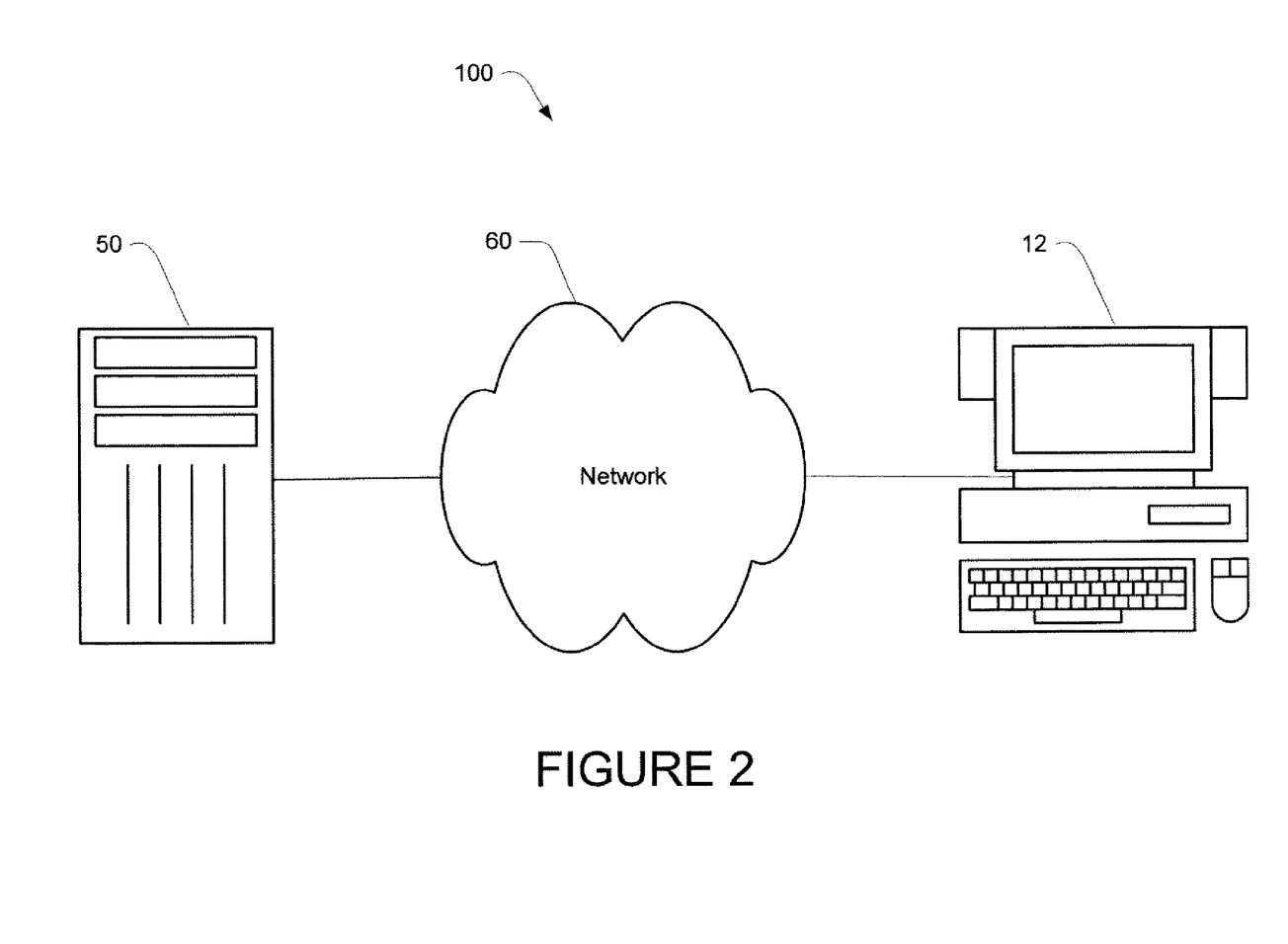
FIG. 2 is a diagram of a system in accordance with an aspect of the present invention.

Referring to FIGS. 1-2, a communication system 100 in accordance with one aspect of the invention may provide for exchange of data between a client computer 12 and a server computer 50 over a communication network 60. The client computer 12 contains a processor 20, memory 22 and other components typically present in general purpose computers. In addition, the server 50 contains a processor 70 and a memory 72.

The memory 22 stores information accessible by the processor 20, including instructions 24 that may be executed by the processor 20 and data 26 that may be retrieved, manipulated or stored by the processor 20. Similarly, the memory 72 stores information accessible by processor 70, including instructions 76 that may be executed by the processor 70 and data 74 that may be retrieved, manipulated or stored by the processor 70. The memory may be of any type capable of storing information accessible by the processor, such as a hard-drive, memory card, ROM, RAM, DVD, CD-ROM, write-capable, read-only memories.

The processors 20, 70 may comprise any number of well known processors, such as processors from Intel Corporation. Alternatively, the processors may be a dedicated controller such as an ASIC.

The instructions 24, 76 may comprise any set of instructions to be executed directly (such as machine code) or indirectly (such as scripts) by the processors 20, 70, respectively. In that regard, the terms "instructions," "steps" and "programs" may be used interchangeably herein. The instructions may be stored in object code form for direct processing by the processor, or in any other computer language including scripts or collections of independent source code modules that are interpreted on demand or compiled in advance. The functions, methods and routines of instructions in accordance with the present invention are explained in more detail below.

The data 26, 74 may be retrieved, stored or modified by the processors 20, 70 in accordance with the instructions 24, 76, respectively. The data may be stored as a collection of data. For instance, although the invention is not limited by any particular data structure, the data may be stored in computer registers, in a relational database as a table having a plurality of different fields and records, XML documents, or flat files. The data may also be formatted in any computer readable format such as, but not limited to, binary values, ASCII or EBCDIC (Extended Binary-Coded Decimal Interchange Code). Moreover, the data may comprise any information sufficient to identify the relevant information, such as descriptive text, proprietary codes, pointers, references to data stored in other memories (including other network locations) or information which is used by a function to calculate the relevant data.

Although the processor and memory are functionally illustrated in FIG. 1 within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one embodiment, the client computer 12 may be a general purpose computer, intended for use by a person, having all the internal components normally found in a personal computer such as a central processing unit (CPU), display 30, input 32 such as a CD-ROM drive, mouse, keyboard or microphone, and a hard-drive, speakers, modem and/or router (telephone, cable or otherwise) and all of the components used for connecting these elements to one another. Moreover, computers 50, 12 in accordance with the systems and methods described herein may comprise any device capable of processing instructions and transmitting data to and from humans and other computers, including network computers lacking local storage capability, PDAs with modems and Internet-capable wireless phones. Although the only input means shown in FIG. 1 are the mouse and keyboard, other means for inputting information from a human into a computer are also acceptable such as a microphone, touch-sensitive screen, voice recognition, etc.

The server 50 and the client computer 12 are capable of direct and indirect communication, such as over the network 60. Although only a single client computer and a single server are depicted in FIGS. 1 and 2, it should be appreciated that a typical system can include a large number of connected computers and several servers to which the computers can connect, with each different computer being at a different node of the network. The network, and intervening nodes, may comprise various configurations and protocols including the Internet, intranets, virtual private networks, wide area networks, local networks, private networks using communication protocols proprietary to one or more companies, Ethernet, WiFi and HTTP. Such communication may be facilitated by any device capable of transmitting data to and from other computers, such as modems (e.g., dial-up or cable), networks cards and wireless interfaces.

In accordance with one aspect of the invention, instructions 76 in server 50 may include a search engine 78 application and communication routines 80. The search engine receives search queries and generates search results in response, such as the search results provided by Google.com. While advantageous when used in connection with search engines, it will be understood that the system and method is not limited to any particular application.

The communication routines 80 assist in the receipt and transmission of the information, such as placing the results into the payload data portion of a data packet and transmitting the results to a web-browser application running on the client device in accordance with the TCP communication protocol. For example, the functions of sending, receiving and processing the TCP packets may be accomplished using communication routines provided by operating systems such as Linux and Microsoft Windows.

Data 74 in the server 50 may include data 82 received from client 12 over network 60. The data 82 received from client 12 may include a search request that is input by a user into a web-browser application running on the client device and directed to the search engine running on the server device.

Data 74 may also include data 84 to be transmitted from the server device 50 to the client device 12 over network 60. The data 84 to be transmitted from the server to the client may include payload and redundant data generated by the search engine in response to the search request. The payload data may include, for example, webpage formatting data and search results data generated by the search engine in response to the search request.

Instructions 24 in client 12 may include a web-browser application 38 and communication routines 40. The web-browser application 38 may communicate a search request, input by a user into the web-browser and directed to the search engine running on the server, to the communication routines 40, which may service data transmissions between client 12 and server 50 and transmit the search request to the search engine running on the server device in accordance with the TCP communication protocol. The web-browser application may also format and display, to the user, the payload data received from the server in response to the search request, as part of one or more web-pages.

The communication routines 40 assist in the receipt and transmission of the information from the client device to the server device. For example, the communication routines 40 may place the search request into the data portions of one or more data packets and transmit the packets to the search engine application running on the server device in accordance with the TCP communication protocol. In addition, the functions of sending, receiving and processing the TCP packets may be accomplished using communication routines provided by operating systems such as Linux and Microsoft Windows.

Data 26 in the client computer 12 may include data received by the communication routines 40 from server 50 over the network. The data 42 received from the server may include payload and redundant data generated by the search engine running on the server in response to a search request.

Data 26 may also include data 44 to be transmitted via the communication routines 40 from the client 12 to the server 50 over the network 60. The data 44 to be transmitted to the server may include a search request input by a user into the web-browser running on the client device.

An exemplary operation in accordance with the process shown in FIG. 10 and various aspects of the invention follows below. It should be understood that the following operations do not have to be performed in the precise order described below. Rather, various steps can be handled in reverse order or simultaneously.

Figure 10:
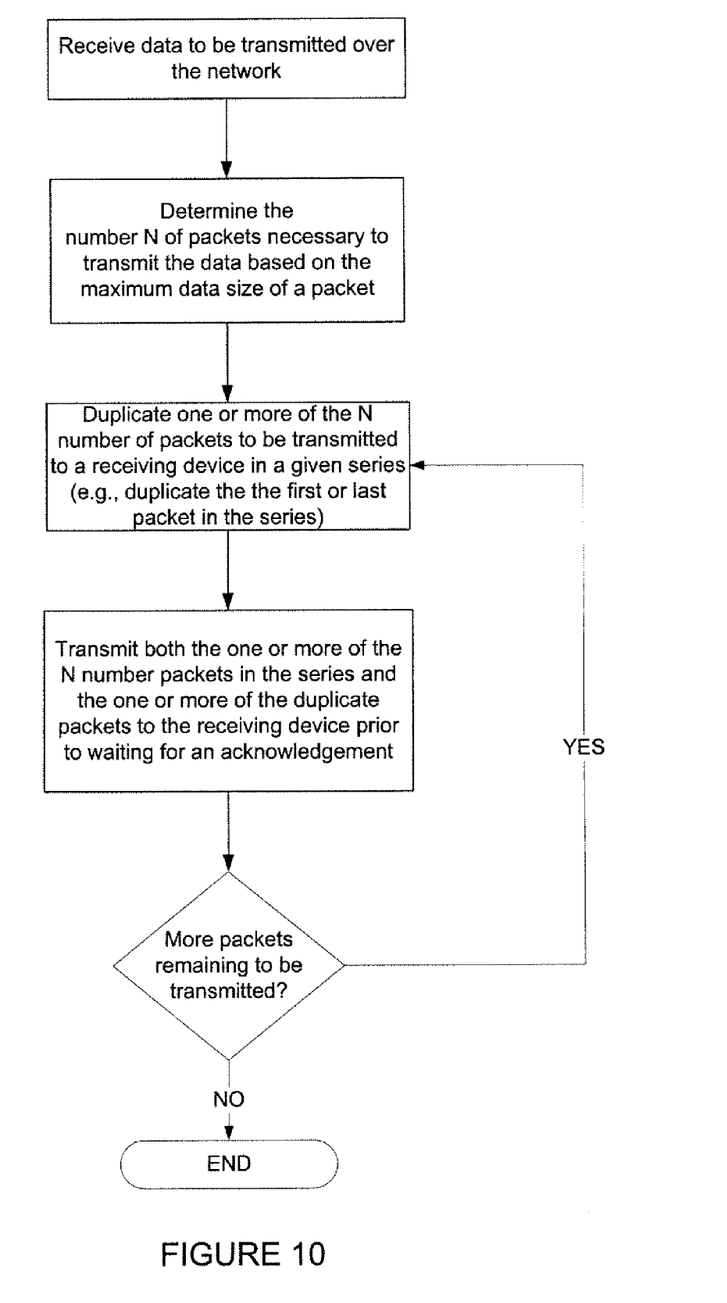
FIG. 10 illustrates a flow diagram of a process in accordance with an aspect of the present invention.

As illustrated in FIG. 10 the server may determine a minimum number N of data packets that are necessary to transmit payload data (e.g., search results) to the client via a communication protocol, where each of the N packets may include a different portion of the search results, and where the Nth packet is the "last" packet and contains the last portion of the search results. In addition to transmitting the N number of packets to the client, in one aspect the server may preemptively, and contiguously along with the other packets, transmit one or more number of duplicate packets to the client. For example, in addition to transmitting a first series of packets, the server may also contiguously transmit the last packet twice, the last packet and the penultimate packet twice, or one or more duplicates of other packets. At the other end, the client may receive and discard any duplicate packets, and display the search results to the user.

As indicated earlier, the TCP protocol provides a MSS value that limits the maximum amount of data that may be included in a single TCP packet. In addition, the TCP protocol provides a CW value that further limits the maximum number of packets that a server may transmit in a series prior to receiving an acknowledgement from the client indicating that additional packets may be sent.

In one aspect, the server may determine, based on the MSS value, the minimum number N of packets necessary to transmit the search results. If the minimum number N of packets to be transmitted to the client is greater than the number of packets that may be transmitted in a series based on the current value of CW, the server may initially transmit a first series of data packets to the client, where the number of packets transmitted in the first series is the maximum number of packets allowable but fewer than the total N number of packets to be transmitted to the client.

Upon receiving an acknowledgement from the client indicating the successful reception of one or more packets transmitted in the first series, the server may increase the value of CW by the number of acknowledged packets and again determine if the remaining number of packets to be transmitted to the client is greater than the number of packets that may be transmitted based on the revised value of the CW. If the remaining number of packets to be transmitted is still greater, the server may again transmit the maximum allowable number of packets based on the current CW in a second series of packets and repeat the process described above.

After repeating the process above several times, the server may determine that the final remaining number of packets to be transmitted in a given series to the client is less than or equal to the number allowed by the current CW. Thus, the server may now transmit the final remaining number of packets in the final series, where the final series of packets transmitted to the client also includes the Nth or last packet.

While the CW value restricts the maximum number of unacknowledged packets transmitted in a given series, it does not typically restrict the number of duplicate packets that may be transmitted. Thus, in the example above, the server may not only transmit a given series of packets, but may also contiguously transmit one or more duplicate packets, where the duplicate packets are duplicative of the one or more data packets transmitted to the client in a given series.

In many cases transmitting the last packet in the final series and one or more packets that are duplicates of the last packet preemptively and contiguously with the other packets in the final series reduces latency when the last packet is lost in transmission. This is because the likelihood of the last packet and the duplicate packets becoming lost is much smaller than the likelihood of only the last packet becoming lost.

As indicated earlier, the TCP protocol provides various mechanisms for efficient and reliable transmission of data. The loss of any one of the packets (except the last packet) transmitted in a series to the client typically results in a data packet being received out of sequence at the client device. By way of example, if five packets are transmitted in a series and the fourth packet is lost in transmission, the client may receive the first, second, third, and fifth packet in that order. Based upon receiving the fifth packet prior to receiving the fourth, the client may determine that the fourth packet has been lost or delayed.

Conventionally, the client device will transmit an immediate duplicate acknowledgment to the server when it receives an out of sequence data packet. The reception of the duplicate acknowledgement allows the server to determine that a particular data packet has not been received by the client, and prepares the server for retransmitting the lost packet when a final determination is made that the packet is indeed lost and not received by the client (the server typically makes the final determination after receiving three duplicate acknowledgements from the client indicating that the packet has not been received).

While the loss of any transmitted packet may increase latency, the loss of the last packet can disproportionately affect latency. As in the previous example, five data packets may be transmitted in a series to the client and every packet except for the last packet may be received at the client in the order it was transmitted. Because none of the packets received at the client is an out of order packet, the client will simply acknowledge the reception of the first four packets without any indication that the fifth packet has been lost. Indeed, in the example above, even if the first four packets are not received in order, the client device simply cannot provide any indication as to the loss of the fifth packet because it has no way to determine that a last packet exists and has been lost.

At the other end, the server, after waiting for an acknowledgement of the last packet for a prescribed amount of time based on the estimated network conditions, may determine without additional input from the client device that the last packet has been lost and retransmit the packet. However, under some network conditions, the server may wait for a disproportionately large amount of time as large as two (2) seconds or more before the server finally retransmits the last packet.

Thus, preemptively transmitting one or more duplicate packets contiguously with the last packet prior to waiting a period of time to receive an acknowledgement of the last packet may, in certain circumstances, increase the likelihood that at least one packet containing the portion of the data included in the last packet is received at the client. In many cases, this will reduce the latency (measured from the perspective of a user of the data) caused by the loss of the last packet. Furthermore, in the event that none of the packets transmitted to the client device are lost, the client device may simply discard any duplicate packets received by the client without any significant impact on the latency.

FIGS. 3-9 illustrate an exemplary embodiment of a transmission. Client device 350 requests and receives information from server 310. For example, a user may use a browser 360 executed by client device 350 to connect to a web site hosted by server 310 in order to transmit a search query 380 to the server's search engine 330 via web pages provided by the server. As shown by the dotted lines, the search query may be provided to the search engine with the assistance of the communication routines 320.

Figure 3:
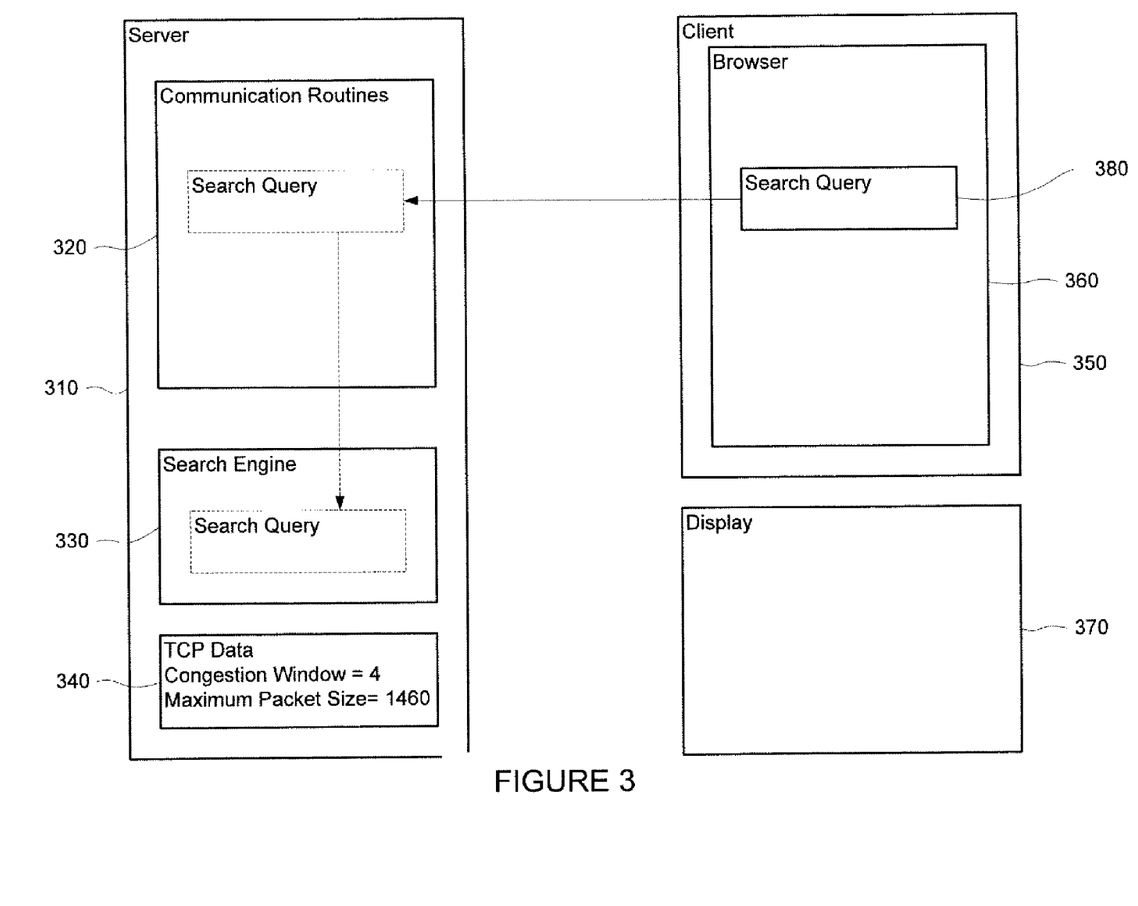
FIGS. 3-9 illustrate an exemplary operation in accordance with one aspect of the present invention.

In accordance with TCP/IP protocol, the server 310 and client device 350 may have already established values (shown as TCP data 340) indicating that the server side MSS value is 1460 bytes, and the CW value is set to 4.

Figure 4:
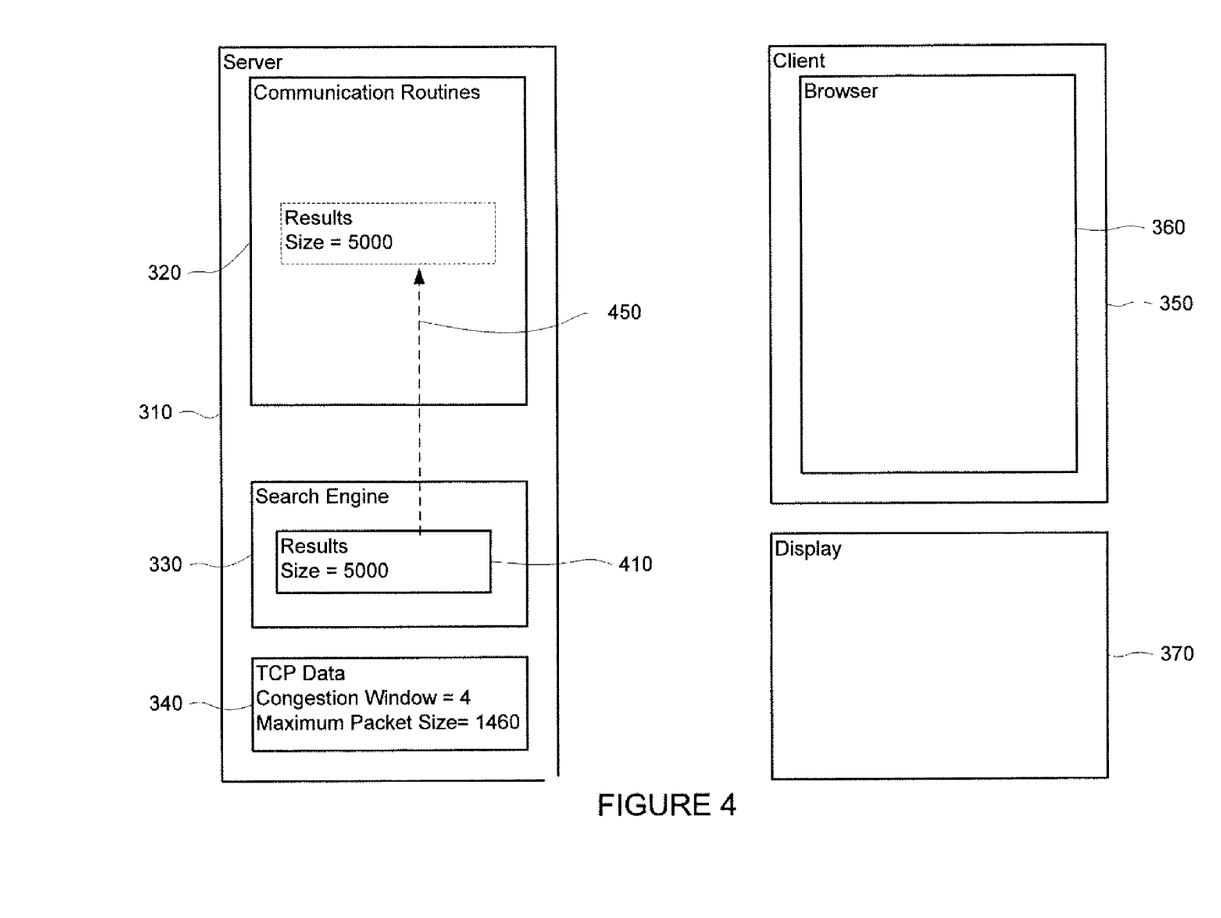

As shown in FIG. 4, the search engine 330 may generate results 410 for display to the user on a web page and pass the results (as shown by dashed line 450) to the communication routines 320 for transmission to the browser application on the client. For example, the results may include any information, including information that can be transmitted quickly because it is completely or mostly independent of the user's query such as text and images that are always present at the top or bottom of the web page sent to the user. Instead or in addition, the initial results may include the search results initially retrieved in response to the query, such as sponsored ads or non-sponsored results. It will be assumed for the purposes of the example that the results are 5000 bytes compared to the MSS value of 1460 bytes.

In a typical prior art system and method operating in accordance with TCP/IP protocol, communication routines would parse the results into the least number of required packets. For example, in such a system and method, the results 410 may be sent immediately to the client device in four packets, where the first, second, and third packets each contain 1460 bytes of a first, second, and third portion of the results, respectively, and where the fourth or last packet contains the remaining 620 bytes of the last portion of the results. If the fourth (i.e., last) packet is lost in transmission, the client device will not indicate (or even know about) the loss of the last packet and the server will be forced to wait for a dynamically determined prescribed period of time before it can resend the last packet.

In accordance with one aspect of the present system and method, the server determines whether the minimum number N of packets required to transmit the results is less than the maximum allowable number packets that can be transmitted in a series to the client.

Figure 5:
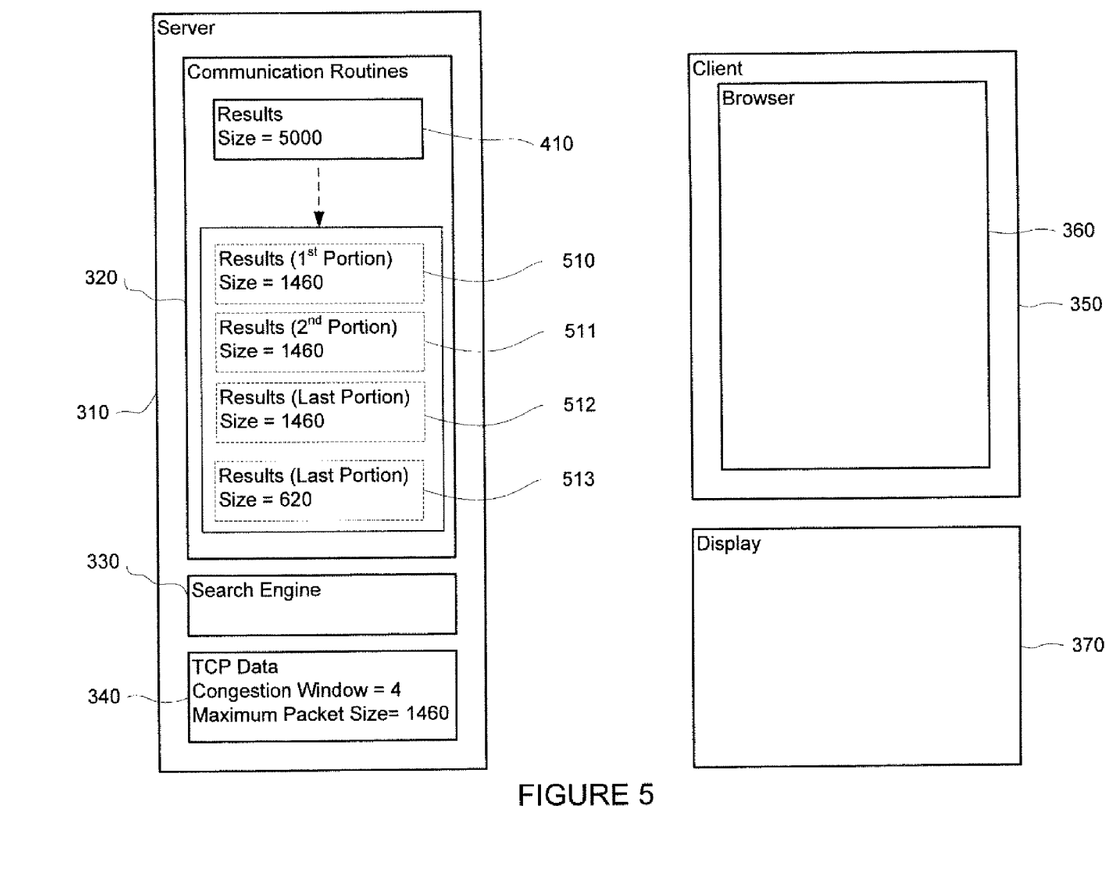

For example, as shown in FIG. 5, the server may first fit as much as data as possible into the least number of packets (510-513) necessary to transmit the results 410. The server then compares the number of packets it created with the congestion window. In that regard, the server determines that the number of packets it is about to transmit (4 packets) is equal to the number of packets that server is currently permitted to transmit to the client in a series (the Congestion Window is 4 packets).

Figure 6:
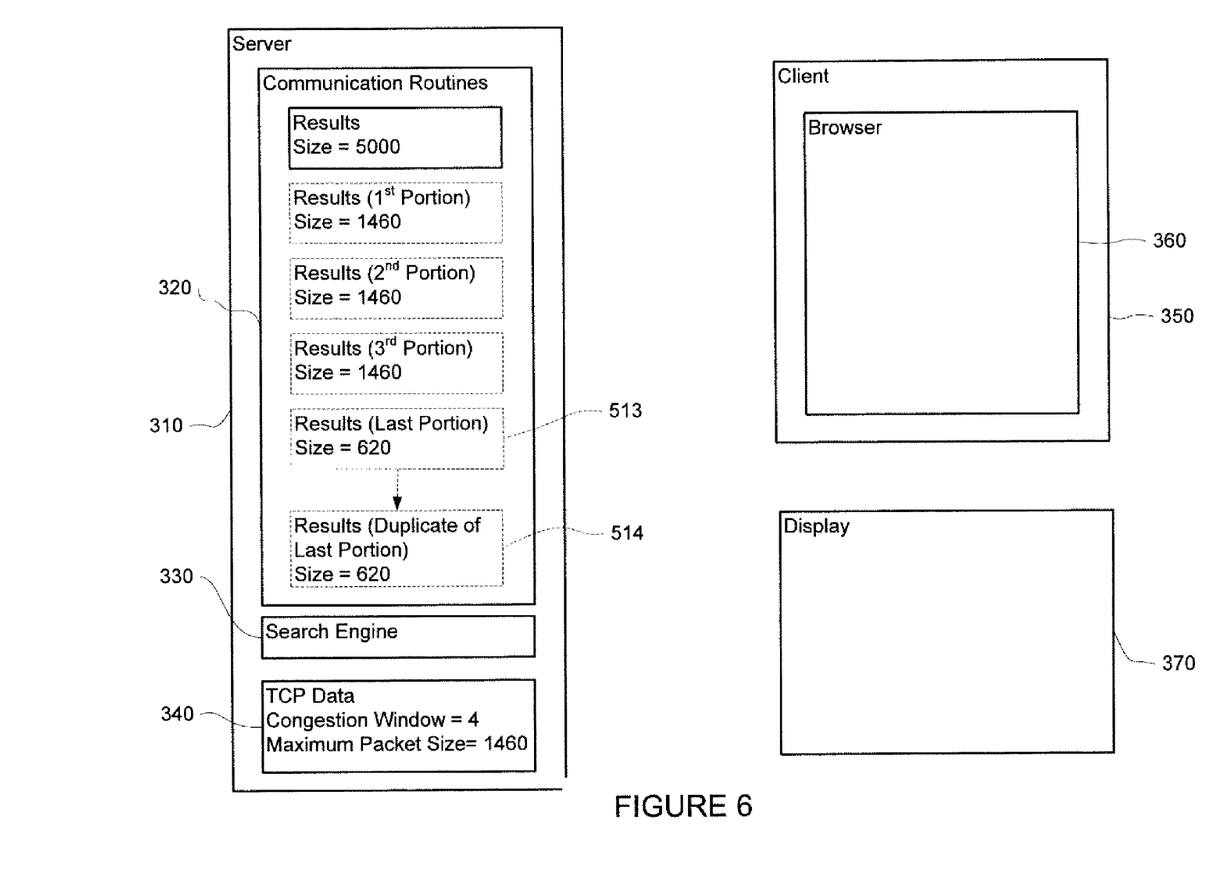

In addition to determining the allowable number of packets (510-513) that may be transmitted, the server may also duplicate one of the packets 510-513 and transmit the duplicate. For example, in one aspect of the system and method and as shown in FIG. 6, the server creates another packet 514 that is duplicate of the last packet 513 to be transmitted. As a result, the server will now transmit a number of packets (510-513) equal to the number it is permitted to transmit based on the current value of the congestion window, and will also additionally transmit a duplicate packet 514.

In another aspect of the system and method, the server may duplicate a different packet than the last packet. Additionally, if the server determines that it will create more than one duplicate, it may duplicate the last portion multiple times or different portions in different combinations, such as duplicating both packets 510 and 511. Although most aspects of the system and method are not limited to whether the first or last packet to be transmitted is duplicated (or any other packet for that matter), in certain circumstances the duplication of the last packet may be more advantageous than duplicating other packets as described above. For instance when there is an anticipated delay between the transmission of packets 510 and 511, the first of two such packets (e.g., packet 510) may be duplicated. Transmitting the first packet 510 and its duplicate may result in client 350 providing an acknowledgement sooner, which, when received at the server, may allow the server to increase the value of CW earlier and transmit a greater number of packets in a subsequent series.

Figure 7:
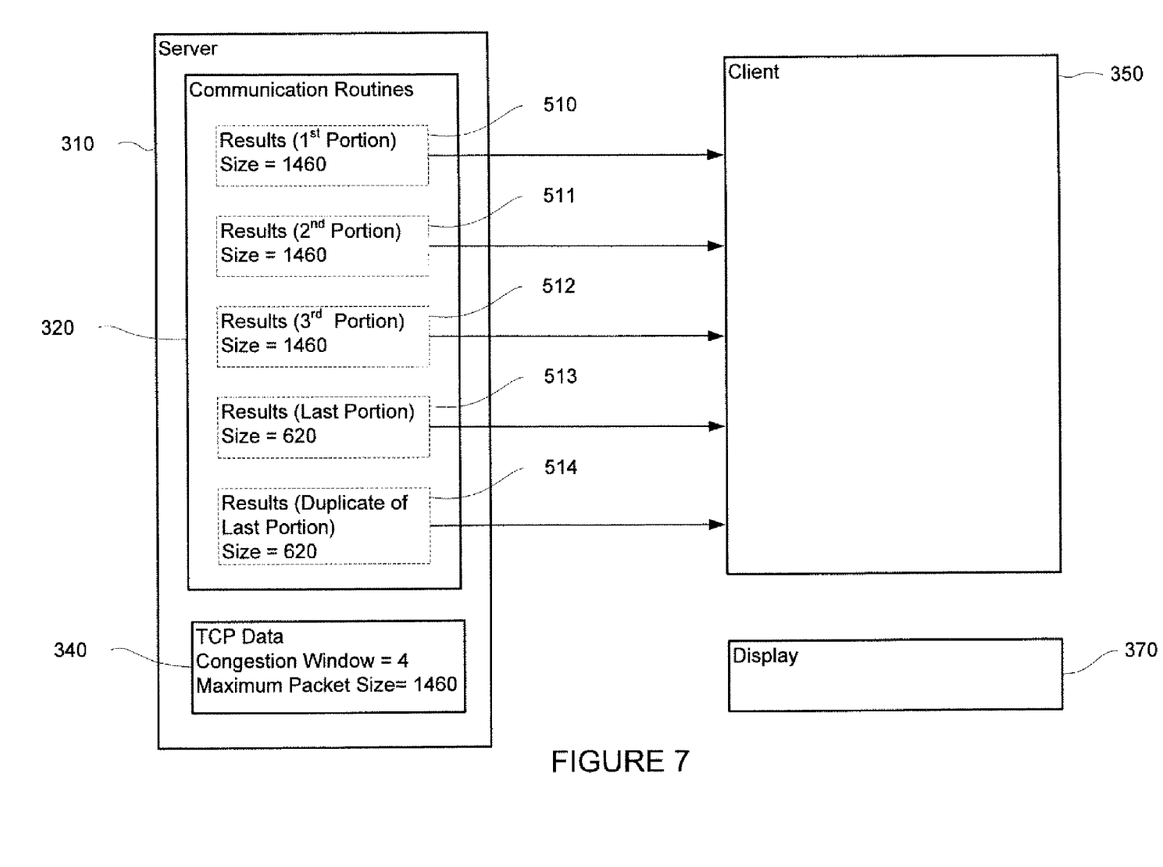

As shown in FIG. 7, the server 310 transmits the four packets 510-13 and the duplicate packet 514 to the client device 350. Because the server transmits a duplicate packet 514 containing the same data as the last packet 513, there is a much greater likelihood of that the client device will receive at least one packet containing the last 620 byte portion of data.

Figure 8:
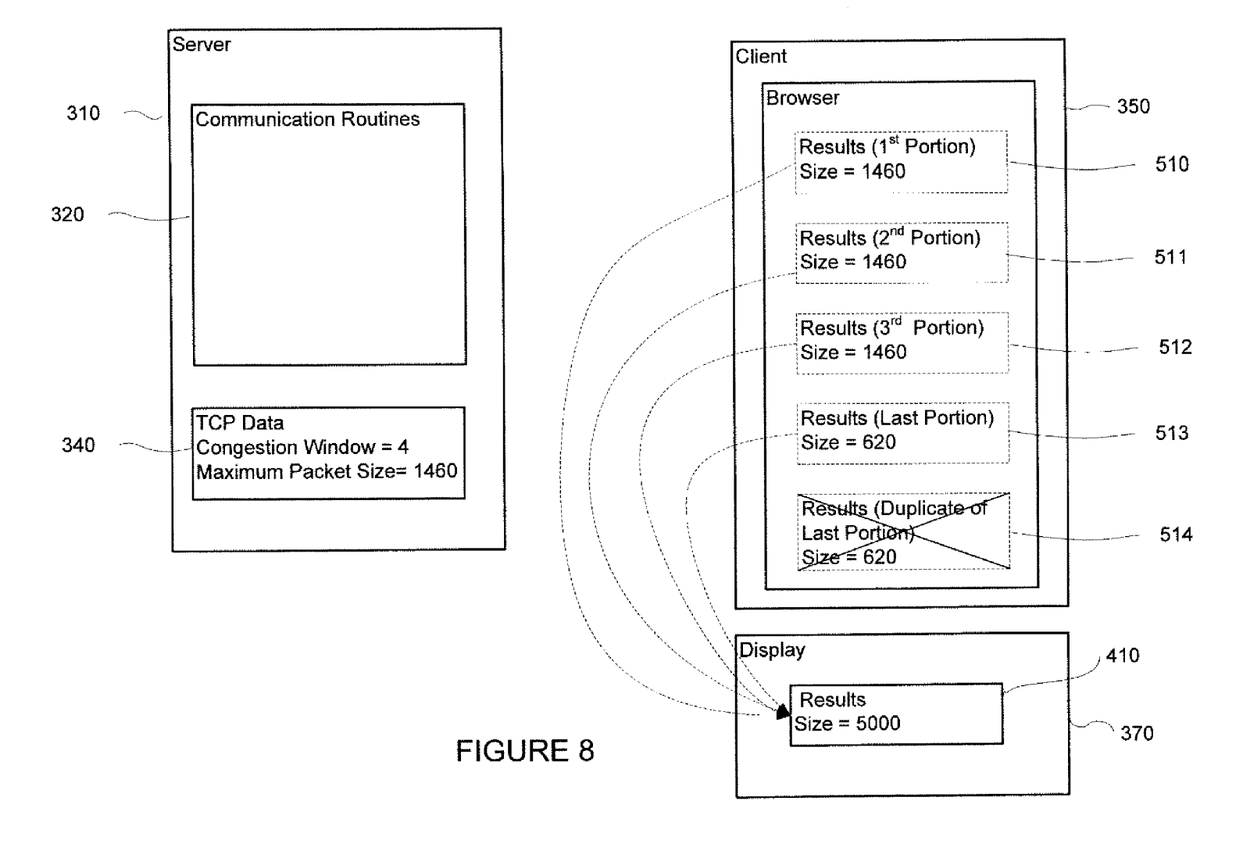

As shown in FIG. 8, if all transmitted packets are received at the client device, the client may display the data contained in packets 510-513 of the results (i.e., all of the results 410) on the display 370 while simply discarding the duplicate data packet 514.

Figure 9:
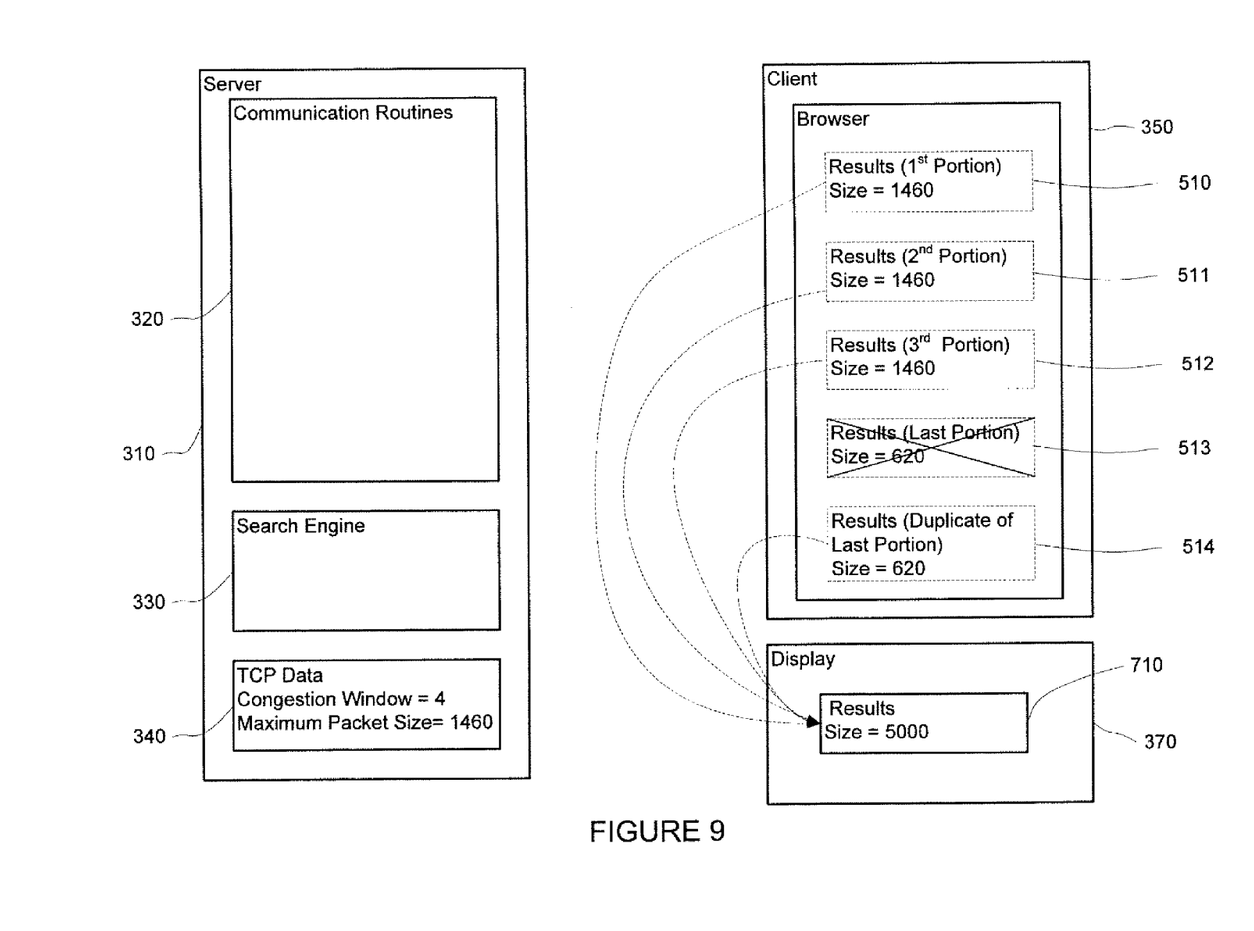

Alternatively, and as shown in FIG. 9, if the last or packet 513 is lost in transmission and not received by the client, but the duplicate packet 514 is received, the client may display the data 710 contained in packets 510, 511, 512 and duplicate packet 514, thus reducing latency from the perspective of the user viewing the data.

In another aspect, the system and method will continue to determine the whether duplicate packets should be transmitted to reduce the latency caused by the loss of the last packet. For example, if additional search results data becomes available at a later time after transmitting the first 5000 bytes of results in the example above, the system and method may repeat the process described above and transmit one or more duplicate packets containing a portion of the additional result data.

The aspects of the invention disclosed herein have the advantage of being flexible enough to accommodate a variety of alternatives. For example, the creation and transmission of duplicate packets may be performed by the search engine, by the operating system or another routine on the sending device.

Yet further, the system and method may also be used with client devices that operate in accordance with conventional implementations of the TCP/IP protocol. In another aspect, the client device implements routines that complement the actions of the server, such as searching for and removing the duplicate packets added by the server.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of transmitting packets over a network comprising:
    receiving first data to be transmitted via the network to a client device;
    determining a first value with a processor, where the first value is based on the amount of the first data and a maximum data size of a data packet;
    generating a first series of data packets, each data packet in the first series containing a different portion of the first data that is determined based on the first value;
    determining, prior to receiving an indication from the client device for transmission of duplicate data packets, whether one or more duplicate data packets should be transmitted;
    based upon the determination, generating the one or more duplicate data packets, each of the duplicate data packets corresponding to one of the data packets in the first series;
    transmitting without delay, via the network, the one or more duplicate data packets contiguously with the first series of data packets to the client device;
    continuing to determine whether additional duplicate data packets should be transmitted contiguously with a second series of data packets based on whether a packet from at least one of the one or more duplicate data packets and the first series of data packets is lost during the transmission; and
    based upon the continued determination, transmitting the additional duplicate data packets contiguously with the second series of data packets.

2. The method of claim 1, wherein the amount of first data in at least two of the plurality of data packets transmitted to the client device is less than the maximum data size.

3. The method of claim 1, wherein the number of data packets transmitted in the first series to the client device is based on a congestion window value determined in accordance with the TCP protocol.

4. The method of claim 1, wherein the indication from the client device that additional data packets may be sent is an acknowledgement packet received via the network in accordance with the TCP protocol.

5. The method of claim 1, wherein the maximum data size of a data packet is based on an MSS value in accordance with the TCP protocol.

6. The method of claim 1, wherein the first value is determined such that the amount of first data included in at least one of the plurality of data packets transmitted to the client device is equal to the maximum data size.

7. The method of claim 1, wherein the first value is determined such that the amount of first data included in all but two of the plurality of data packets transmitted to the client device is equal to the maximum data size.

8. The method of claim 1, wherein at least one of the one or more duplicate data packets transmitted to the client device is duplicative of a last packet transmitted in the first series.

9. A system comprising:
a memory storing instructions and data, the data comprising first data to be transmitted over a network to a client device;
a processor configured to:
determine a first value based on the amount of the first data and a maximum data size of a data packet;
generate a first series of data packets, each data packet in the first series containing a different portion of the first data that is determined based on the first value;
determine, prior to receiving an indication from the client device for transmission of duplicate data packets, whether one or more duplicate data packets should be transmitted;
based upon the determination, generate the one or more duplicate data packets, each of the duplicate data packets corresponding to one of the data packets in the first series;
transmit without delay, via the network, the one or more duplicate data packets contiguously with the first series of data packets to the client device;
continue to determine whether additional duplicate data packets should be transmitted contiguously with a second series of data packets based on whether a packet from at least one of the one or more duplicate data packets and the first series of data packets is lost during the transmission; and
based upon the continued determination, transmit the additional duplicate data packets contiguously with the second series of data packets.

10. The system of claim 9, wherein the amount of first data in at least two of the plurality of data packets transmitted to the client device is less than the maximum data size.

11. The system of claim 9, wherein the number of data packets transmitted in the first series is based on a congestion window value determined in accordance with the TCP protocol.

12. The system of claim 9, wherein the indication from the client device that additional data packets may be sent is an acknowledgement packet in accordance with the TCP protocol.

13. The system of claim 9, wherein the maximum data size of a data packet is based on an MSS value in accordance with the TCP protocol.

14. The system of claim 9, wherein the first value is determined such that the amount of first data included in at least one of the plurality of data packets transmitted to the client device is equal to the maximum data size.

15. The system of claim 9, wherein the first value is determined such that the amount of first data included in all but two of the plurality of data packets transmitted to the client device is equal to the maximum data size.

16. The system of claim 9, wherein at least one of the one or more duplicate data packets transmitted to the client device is duplicative of a last packet transmitted in the first series.

17. A system comprising:
a first device at a first node of a network, the first device comprising a first memory storing a first set of instructions and a first processor that processes data in accordance with the first set of instructions;
a second device at a second node of the network, the second device comprising a second memory storing a second set of instructions and a second processor that processes data in accordance with the second set of instructions;
the first device having access to first data to be transmitted over the network to the second device;
wherein the first set of instructions comprise:
determining a first value based on the amount of the first data and a maximum data size of a data packet;
generating a first series of data packets, each data packet in the first series containing a different portion of the first data that is determined based on the first value;
determining, prior to receiving an indication from the second device for transmission of duplicate data packets, whether one or more duplicate data packets should be transmitted;
based upon the determination, generating the one or more duplicate data packets, each of the duplicate data packets corresponding to one of the data packets in the first series;
continuing to determine whether additional duplicate data packets should be transmitted contiguously with a second series of data packets based on whether a packet from at least one of the one or more duplicate data packets and the first series of data packets is lost during the transmission;
based upon the continued determination,
transmitting the additional duplicate data packets contiguously with the second series of data packets;
and wherein the second set of instructions comprise:
receiving one or more of the transmitted first series of data packets and the one or more duplicate data packets from the first device via the network;
receiving one or more of the transmitted second series of data packets and the one or more additional duplicate data packets from the first device via the network;
transmitting an indication via the network to the first device that additional data may be sent;
discarding one or more received data packets from the first device determined to be duplicative of another data packet received from the first device; and
displaying first data contained in the one or more of received data packets to a user on a display.

18. The system of claim 17, wherein the amount of first data in at least two of the plurality of data packets transmitted by the first device is less than the maximum data size.

19. The system of claim 17, wherein the number of packets transmitted in the first series by the first device is based on a congestion window value determined in accordance with the TCP protocol.

20. The system of claim 17, wherein the indication from the second device that additional packets may be sent is an acknowledgement packet in accordance with the TCP protocol.

21. The system of claim 17, wherein the maximum data size of a data packet is based on an MSS value in accordance with the TCP protocol.

22. The system of claim 17, wherein the first value is determined such that the amount of first data included in at least one of the plurality of data packets transmitted by the first device is equal to the maximum data size.

23. The system of claim 17, wherein the second value is determined such that the amount of first data included in all but two of the plurality of data packets transmitted by the first device is equal to the maximum data size.

24. The system of claim 17, wherein at least one of the one or more duplicate packets transmitted by the first device is duplicative of a last data packet transmitted by the first device in the first series.

* * * * *